(12) United States Patent
Kameno et al.

(10) Patent No.: US 6,661,547 B2
(45) Date of Patent: Dec. 9, 2003

(54) MULTI-STRUCTURE HOLOGRAPHIC NOTCH FILTER AND A METHOD OF MANUFACTURING THE SAME

(75) Inventors: Hayato Kameno, Tokyo (JP); Yasunobu Yoshiki, Tokyo (JP)

(73) Assignee: Jasco Corporation, Tokyo (JP)

( * ) Notice: Subject to any disclaimer, the term of this patent is extended or adjusted under 35 U.S.C. 154(b) by 0 days.

(21) Appl. No.: 10/128,376

(22) Filed: Apr. 24, 2002

(65) Prior Publication Data

US 2002/0159110 A1 Oct. 31, 2002

(30) Foreign Application Priority Data

Apr. 27, 2001 (JP) .................................. 2001-132313

(51) Int. Cl.[7] .................................................. G02B 5/32
(52) U.S. Cl. .................................. 359/15; 359/1; 430/1
(58) Field of Search ........................... 359/15, 1; 430/1, 430/2

(56) References Cited

U.S. PATENT DOCUMENTS 4,965,152 A * 10/1990 Keys .............................. 430/1
5,331,445 A * 7/1994 Dickson ........................ 359/15
6,518,944 B1 * 2/2003 Doane .......................... 345/87

* cited by examiner

Primary Examiner—Drew A. Dunn
Assistant Examiner—Leo Boutsikaris
(74) Attorney, Agent, or Firm—Snider & Associates; Ronald R. Snider

(57) ABSTRACT

The object of the present invention is to provide a holographic notch filter which can favorably reject and remove a narrow, desired range of wavelengths of the incident light and a method of easily manufacturing the holographic notch filter. For achievement of the above object of the present invention, a multi-structure holographic notch filter 2 having a holographic recording material 4 arranged on which modulations of the refractive index are recorded by two-beam interference is provided as characterized in that a thin-film filter element 6 is fabricated from a thin form of the holographic recording material 4 in which modulations of the refractive index are recorded by the two-beam interference and a plurality of the thin-film filter elements 6 are joined together to develop a layer arrangement.

2 Claims, 5 Drawing Sheets

2: MULTI-STRUCTURE HOLOGRAPHIC NOTCH FILTER

2: MULTI-STRUCTURE HOLOGRAPHIC NOTCH FILTER

6: THIN-FILM FITER ELEMENT

COMBINATION OF TWO MULTI-STRUCTURE HOLOGRAPHIC NOTCH FILTERS bandwidth BW at a wavelength λ of the
MULTI-STRUCTURE HOLOGRAPHIC NOTCH FILTER AND A METHOD OF MANUFACTURING THE SAME

RELATED APPLICATIONS

This application claims the priority of Japanese Patent Application No. 2001-132313 filed on Apr. 27, 2001, which is incorporated herein by reference.

BACKGROUND OF THE INVENTION

1. Field of the Invention

The present invention relates to a multi-structure holographic notch filter and a method of manufacturing the same and particularly to improvement of the transmissivity and the narrow-band rejection capability.

2. Description of the Related Art

Monochromatic light of a short wavelength such as laser beam is directed to an object. Its scattered lights converge on a diffraction grating through a lens and separate into spectra. The scattered lights include spectral components different in the wavelength to the incident light as well as components identical in the wavelength. The scattered light having the same wavelength as of the incident light is called Rayleigh scattered light while the scattered light having a different wavelength is called Raman scattered light.

The Raman scattered light has a combination of the frequency of the incident light and the proper frequency of the object. Also, the intensity of the Raman scattered light is proportional to the intensity of the incident light and the density of the object. Accordingly, ingredients of the object can be identified and quantitatively determined by spectro analysis of the Raman scattered light.

However, the intensity of the Raman scattered light is generally $10^{-6}$ to $10^{-12}$ times as weak as the intensity of the Rayleigh scattered light. It is hence necessary to precisely isolate only the Raman scattered light to the exclusion of Rayleigh scattered light from the scattered light for high-accuracy measurement of the Raman scattered light.

When a Raman shift of the Raman scattered light is very small, a difference in wavelength between the Raman scattered light and the Rayleigh scattered light is also so small that the detection of the extremely weak Raman scattered light with the Rayleigh scattered light is very difficult. Thus, a filter to preferably remove only the Rayleigh scattered light, which is a light component having a specific wavelength, is necessary. For this purpose, a holographic notch filter is generally used. The notch filter is designed for rejecting a predetermined range of wavelengths of the incident light as different from any typical filter for passing a desired range of wavelengths.

A usual method of manufacturing the holographic notch filter is now explained. The holographic notch filter has a photographic plate 110 arranged to receive two laser beams, an object wave L1 and a reference wave L2, from opposite directions, as shown in FIG. 4.

In this case, as shown in FIG. 5, the two light waves L1 and L2 for hologram create a pattern of interference 112 developed substantially parallel with a recording layer 116 provided on a support 114. Assuming that the refractive index of the recording layer 116 is n, the pattern of interference is pitched at ½n the wavelength of the laser beam.

Through periodic exposure and development processes, the refractive index can be modified to have tens or more periodic levels as shown in FIG. 6.

The refractive index n(x) at the location x in the recording layer 116 is expressed by $$n(x)=n_A+(\tfrac{1}{2})n_P \sin(2\pi x/P), \quad (1)$$

where $n_A$ being the average refractive index $(=(n_H+n_L)/2)$, $n_P$ being a modulation range of the refractive index $(=(n_H-n_L))$, P being a period, $n_H$ being the maximum refractive index, and $n_L$ being the minimum refractive index.

It is desired for the holographic notch filter to reject only the wavelengths of the Rayleigh scattered light. If the band width of the filter for rejecting the wavelength of the incident light is wide, some of the Raman scattered light shifted close to the wavelengths of the Rayleigh scattered light may be removed as well.

It is significantly essential for the holographic notch filter to minimize the band width BW at a wavelength λ of the Rayleigh scattered light to be rejected as shown in FIG. 7. Also, the light absorbance at the wavelength λ has to be high.

The optical density of the holographic notch filter is calculated from $$\text{Optical Density(O.D.)}=\log(100/T)=(1.36\times BW\times N)-\log(4/n_S), \quad (2)$$

where T being the minimum transmissivity, N being the number of periodic levels shown in FIG. 6, and $n_S$ being the refractive index of the substrate.

The band width BW is calculated from $$\text{Band width(BW)}=(n_P)/(2n_A). \quad (3)$$

As apparent from the equation (2), the optical density is proportional to the modulation range of the refractive index saved on the photographic plate and the number of periodic levels shown in FIG. 6. It is also apparent from the equation (3) that the band width is proportional to the modulation range of the refractive index.

It is hence understood that the modulation range of the filter has to be increased to have a higher rate of the optical density.

When the modulation range of the refractive index is increased, the band width also will extend.

For increasing the optical density but minimizing the band width, the filter needs to decrease the modulation range of the filter and increase the number of periodic levels to be recorded. In other words, it is recommended to use a thick recording layer.

In case that the recording layer is too thick, its photosensitive action initiates absorption of light during recording of the modulation of the refractive index into the recording layer by two-beam interference, thus disallowing any uniform exposure action.

Also, in the development process, the thick recording layer may hardly generate a uniform development, resulting in variations in the modification of the refractive index.

As a result, the modulation of the refractive index is not uniform at different locations in the thick recording layer, as shown in FIG. 8. It is hence very difficult to manufacture a high OD filter which is improved in the light transmissivity and in the filtering at a narrow range of wavelengths.

It is strongly required that the holographic notch filter should reject a narrow, desired band of the incident light. However, its conventional method to manufacture a filter with a narrow band width by increasing the recording layer thickness certainly encounters a technical difficulty. For compensation, an improved method has been demanded, but no appropriate technologies can overcome the difficulty so far.

An alternative filter manufacturing method is provided through not photosensitive development but through vapor deposition of the diffraction gating. The vapor deposition is however unsuccessful to implement an OD level of 6 or higher which is essential for the holographic notch filter.

SUMMARY OF THE INVENTION

Its one object is to provide a holographic notch filter which can favorably reject and remove a narrow, desired range of wavelengths of the incident light. And another is to provide a method of easily manufacturing the holographic notch filter.

For achievement of the above objects, a multi-structure holographic notch filter having a holographic recording material arranged on which modulations of the refractive index are recorded by two-beam interference is provided as characterized in that: a thin-film filter element is manufactured from a thin form of the holographic recording material in which modulations of the refractive index are recorded by the two-beam interference; and a plurality of the thin-film filter elements are joined together to develop a layer arrangement.

The multi-structure holographic notch filter of the present invention is preferably modified in which the thin-film holographic element comprises: glass substrates; thin holographic recording materials provided on their corresponding glass substrates and having the modulations of the refractive index recorded therein; and a refractive index adjusting agent which is substantially identical in the refractive index to the glass substrates and the holographic recording materials, wherein the thin holographic recording materials provided on the corresponding glass substrates are fixed faced to face by the refractive index adjusting agent.

The multi-structure holographic notch filter of the present invention preferably also is modified in which the thickness of the thin holographic recording materials ranges from several micrometers to tens micrometers.

The multi-structure holographic notch filter of the present invention preferably is modified in which the number of the thin-film filter elements joined together to develop the layer arrangement is larger than 1000.

A method of manufacturing the multi-structure holographic notch filter of the present invention having a holographic recording material arranged on which modulations of the refractive index are recorded by two-beam interference is provided comprising the steps of: fabricating a thin-film filter element from a thin form of the holographic recording material in which modifications of the refractive index are recorded by the two-beam interference; and joining a plurality of the thin-film filter elements together to develop a layer arrangement.

It is possible that a combination of two or more multi-structure holographic notch filters according to claim 1 rejects two or more ranges of the wavelengths of the incident light. These filters are placed one over another and their rejecting ranges of the wavelengths are different from one another.

DETAILED DESCRIPTION OF THE PREFERRED EMBODIMENT

The present invention will be described in more detail in the form of one embodiment.

Figure 1:
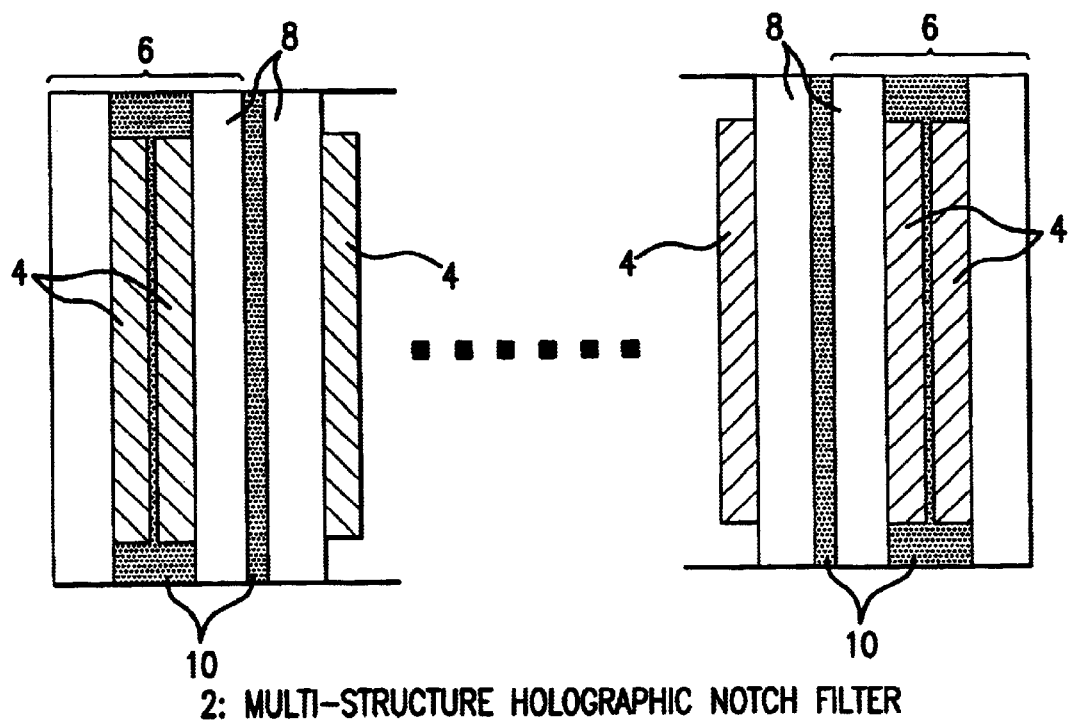
FIG. 1 is a schematic view of a multi-structure holographic notch filter according to the present invention.

FIG. 1 is a schematic view of a multi-structure holographic notch filter according to the present invention. The multi-structure holographic notch filter 2 of the present invention is a modification of a known holographic notch filter made of a holographic recording material in which modulation of the refractive index is recorded by two-beam interference and particularly characterized by multiple layers of thin-film filter element 6 which is fabricated by recording desired modulations of the refractive index by the two-beam interference technique in a thin holographic recording material 4.

As the thin recording material 4 is used, the influence of light absorbency property owing to photosensitive effect can be minimized during the recording of the modulations of the refractive index by the two-beam interference and also can permit no uneven development process therein.

Figure 2:
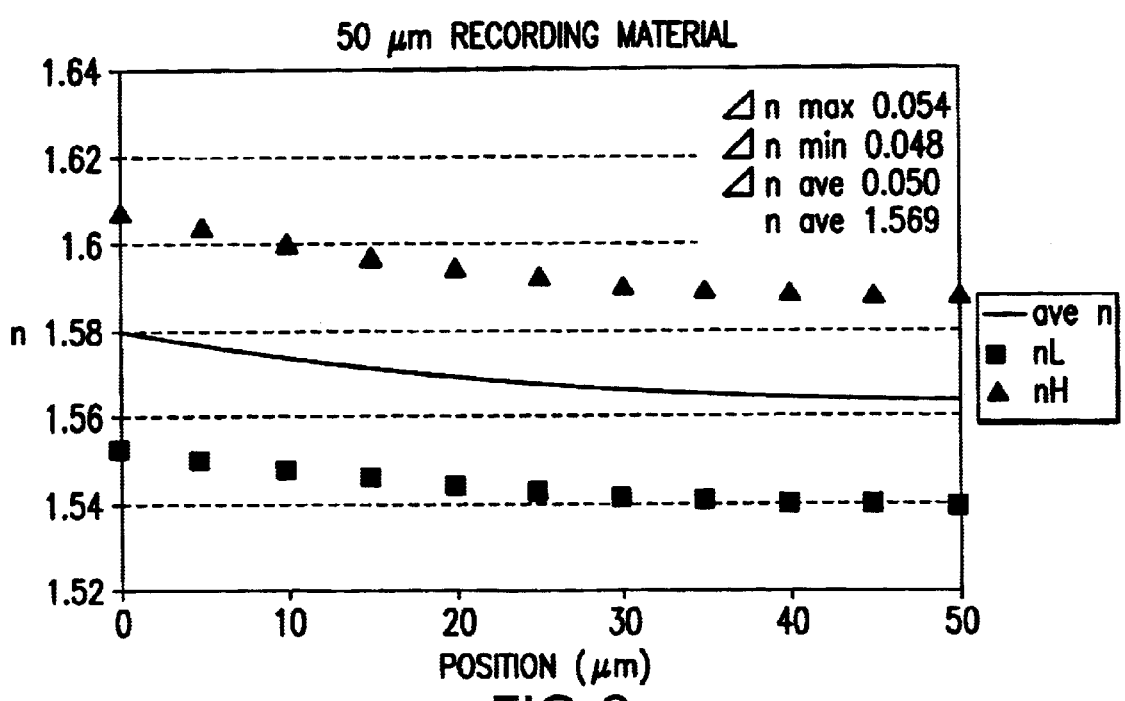
FIG. 2 is a graph showing a profile of modulations of the refractive index at different locations in a thin recording material.

FIG. 2 illustrates a profile of modulations of the refractive index at different locations in the thin recording material.

Figure 8:
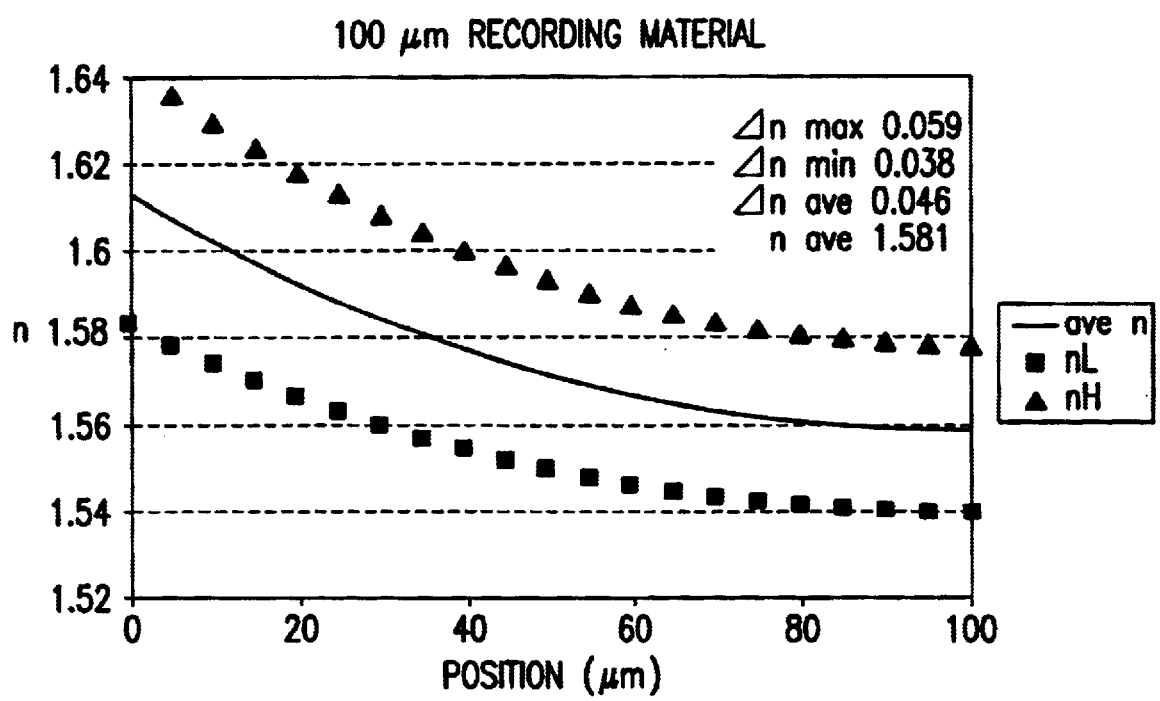
FIG. 8 is a graph showing a profile of variations in the modification of the refractive index at different locations in a thick recording material.

Apparently as compared with some variations of the refractive index modulation at different locations in a thick recording material shown in FIG. 8, the modulation of the refractive index in the thin recording material can be uniform with minimum discrepancies.

Two or more of the thin-film filter elements fabricated in this manner are layered to have high light transmissivity and a high OD filter with a narrow filtering range.

The thin-film filter element 6 of the embodiment of the present invention shown in FIG. 1 is constructed in the following arrangement.

Figure 3:
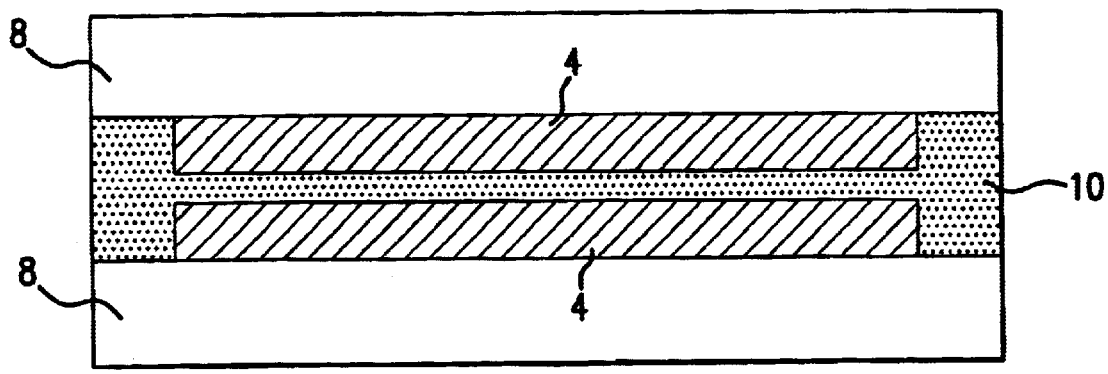
FIG. 3 is a schematic view of a thin-film filter element of the present invention.
Figure 4:
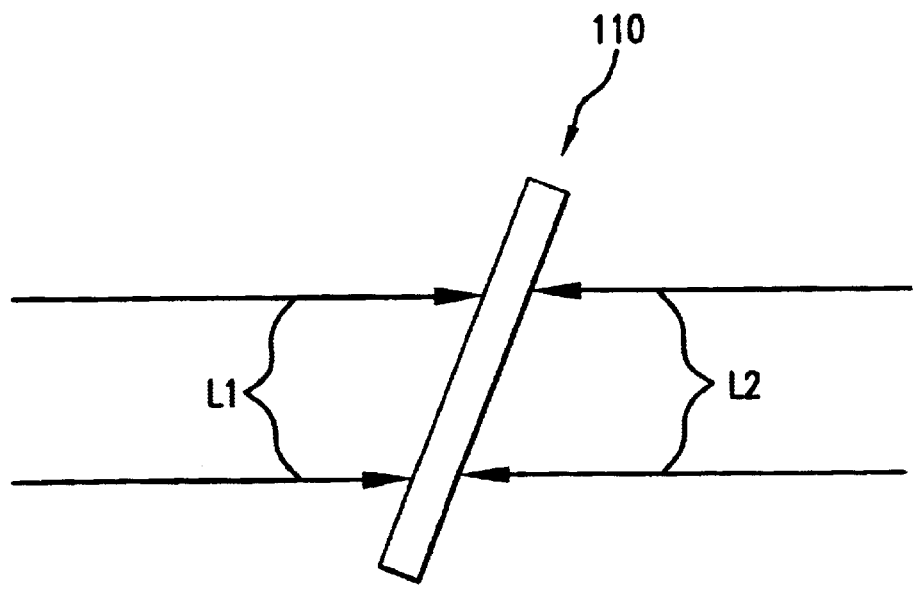
FIG. 4 is an explanatory view showing an exposure action.
Figure 5:
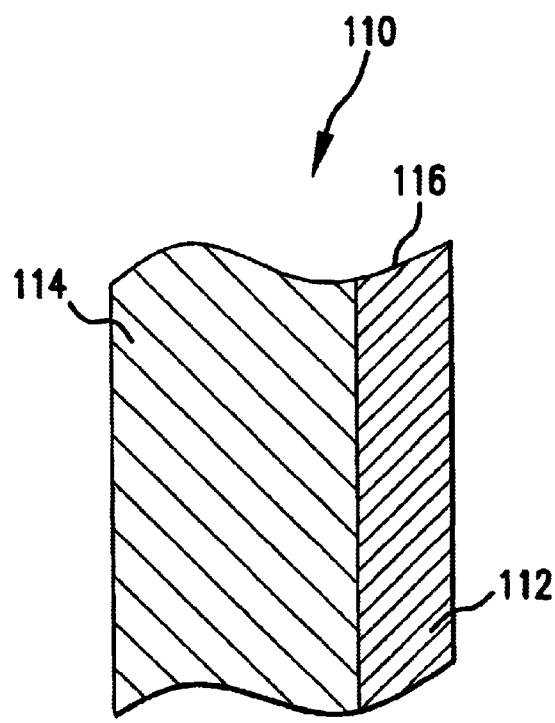
FIG. 5 is a structural explanatory view of a photographic plate.
Figure 6:
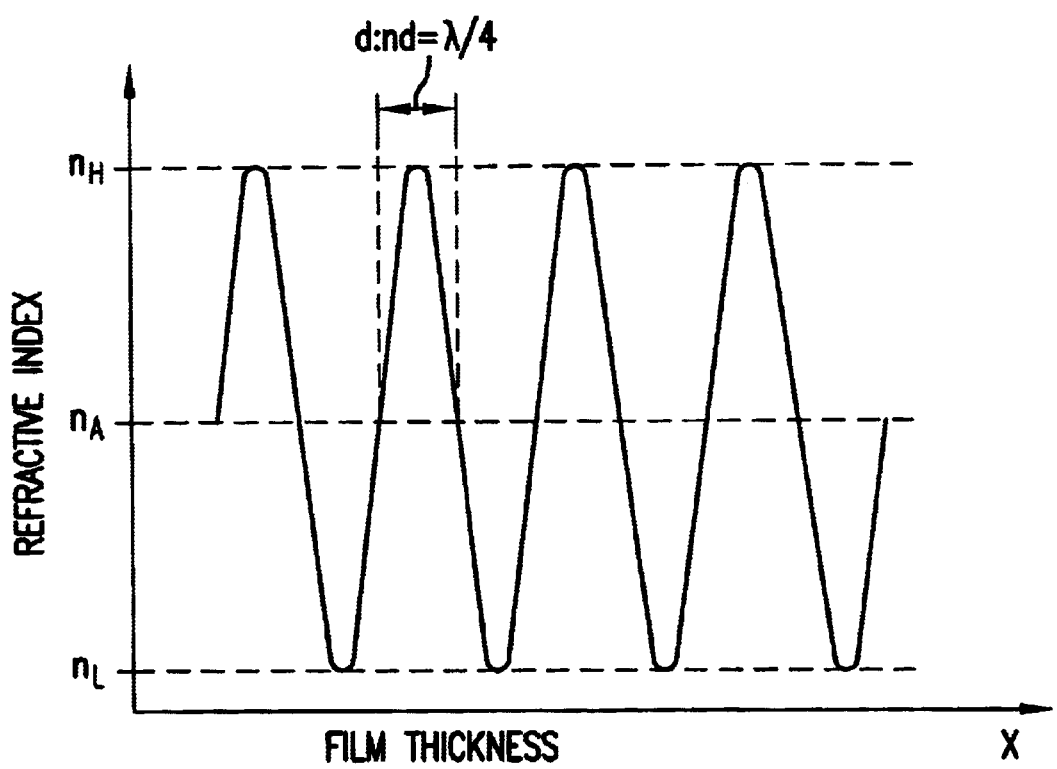
FIG. 6 is an explanatory diagram showing a range of the refractive index at the location X on the photographic plate.
Figure 7:
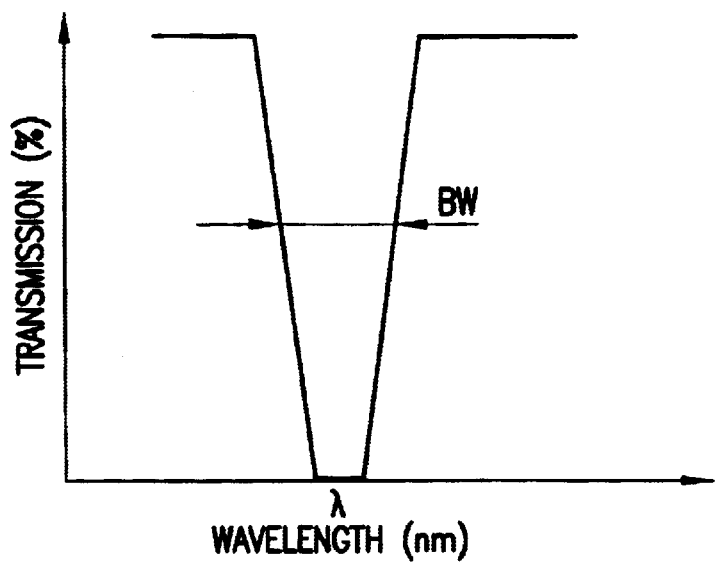
FIG. 7 is an explanatory diagram showing a band width of wavelengths of the incident light to be removed.

FIG. 3 is a schematic view of the thin-film filter element according to the present invention.

As shown in the figure, the thin-film filter element 6 comprises glass substrates 8, thin holographic recording materials 4 provided on their corresponding glass substrates 8 and having desired modulations of the refractive index recorded therein, and a refractive index adjusting agent (an adhesive) 10 which are substantially identical in the refractive index to the glass substrates 8 and the holographic recording materials 4.

As a primary feature of the present invention, the two thin holographic recording materials 4 on their corresponding glass substrates 8 are fixed faced to face by the adhesive refractive index adjusting agent 10.

The arrangement hence allows the thin recording materials to be handled with much ease and also the thin-film filter elements to be layered with ease.

The arrangement permits the recording material to be selected from commercially available, easily handled, and thin recording materials.

In the multi-structure holographic notch filter and its manufacturing method of the present invention, the thickness of the thin holographic recording material ranges from several micrometers to tens micrometers, preferably from 10 $\mu$m to 100 $\mu$m, or more preferably from 40 $\mu$m to 60 $\mu$m.

If its thickness is greater than the above range, the recording material may fail to minimize the photosensitive effect of absorbing light during the recording of the modulation of the refractive index by the two-beam interference and its development create unevenness therein. When too thin, the number of layers to be needed for the required specifications will increase.

The holographic recording material can preferably be selected from silver salt emulsions, dichromate gelatins, photopolymers, and so on.

In the multi-structure holographic notch filter and its manufacturing method of the present invention, the number of the filter layers is favorably larger than 1000, preferably 1500 to 2500, or more preferably 1700 to 2000, depending on the thickness of each holographic recording material.

If the number of the layers exceeds the above range, the light transmissivity may be declined while the high OD level and the narrow filtering band are successfully obtained. When too small, the high light transmissivity may be obtained but the high OD level and the narrow filtering band are declined.

It is thus favorable for implementing the method of manufacturing a multi-structure holographic notch filter from a holographic recording material in which the modulation of the refractive index is recorded by two-beam interference, according to the present invention, that a thin-film filter element is fabricated by recording desired modulations of the refractive index by the two-beam interference technique in a thin form of the holographic recording material and a plurality of the thin-film filter elements are joined together to complete a layer arrangement of the multi-structure holographic notch filter.

Figure 9:
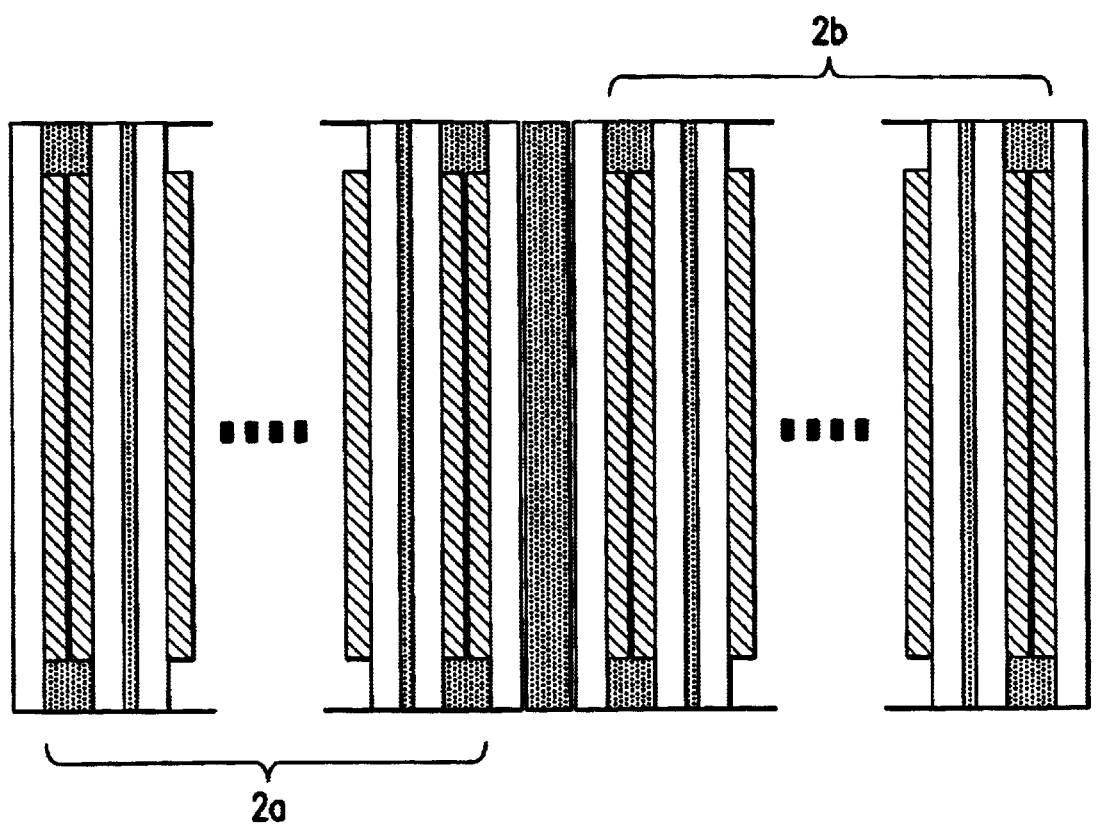
FIG. 9 is schematic view of a combination of two multi-structure holographic notch filters.
Figure 10:
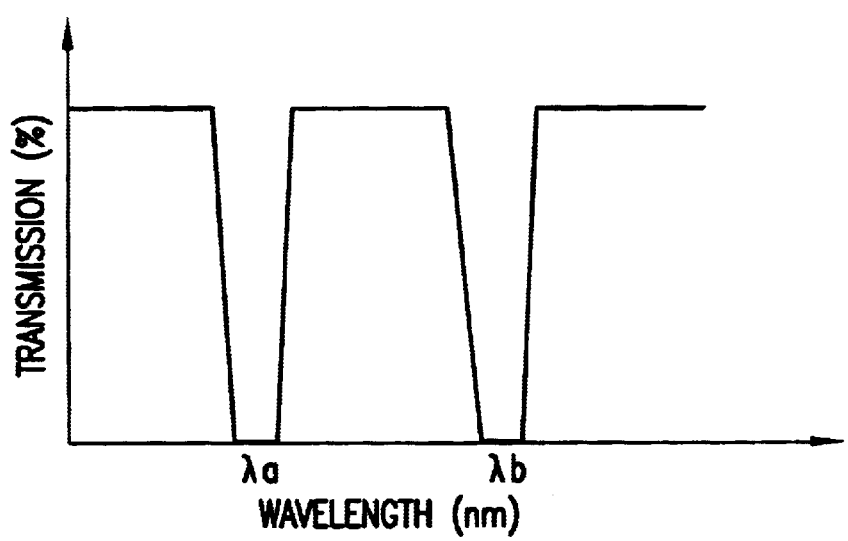
FIG. 10 is an explanatory diagram showing two ranges of wavelengths of the incident light to be removed.

In other example shown in FIG. 9, two multi-structure notch filters are placed one over another. The rejecting ranges of these two filters are different from each other. The multi-structure notch filter 2a in FIG. 9 rejects a range inclusive of the wavelength Ra of the incident light and the multi-structure notch filter 2b rejects a range inclusive of the different wavelength $\lambda$b. The combination of these two filters rejects two ranges of the wavelengths of the incident light as shown in FIG. 10.

It is hence possible to place one over another two or more of the multi-structure holographic notch filters manufactured by the method of the present invention for rejecting two or more different ranges of wavelengths of the incident light.

It would be understood that the present invention is described in conjunction with, but not limited to, a structural example of the thin-film filter element.

As set forth above, the multi-structure holographic notch filter and its manufacturing method of the present invention can be improved in the light transmissivity and the OD level while filtering a narrow, desired range of wavelengths of the incident light.

We claim:

1. A multi-structure holographic notch filter having a holographic recording material arranged on which modulations of the refractive index are recorded by two-beam interference, characterized in that:

a thin-film filter element is fabricated from a thin form of the holographic recording material in which modulations of the refractive index are recorded by the two-beam interference;

a plurality of the thin-film filter elements are joined together to develop a layer arrangement; and wherein the number of the thin-film filter elements joined together to develop the layer arrangement is not smaller than 1000.

2. A method of manufacturing a multi-structure holographic notch filter having a holographic recording material arranged on which modulations of the refractive index are recorded by two-beam interference, comprising the steps of:

fabricating a thin-film filter element from a thin form of the holographic recording material in which modulations of the refractive index are recorded by the two-beam interference; and joining a plurality of the thin-film filter elements together to develop a layer arrangement, wherein the number of the thin-film filter elements joined together to develop the layer arrangement is not smaller than 1,000.

* * * * *